US009538400B2

United States Patent
Ito

(10) Patent No.: US 9,538,400 B2
(45) Date of Patent: *Jan. 3, 2017

(54) RADIO COMMUNICATION SYSTEM, BASE STATION, MOBILE STATION, AND RADIO COMMUNICATION METHOD

(71) Applicant: FUJITSU LIMITED, Kawasaki-shi, Kanagawa (JP)

(72) Inventor: Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,324

(22) Filed: Aug. 3, 2015

(65) Prior Publication Data

US 2015/0341806 A1 Nov. 26, 2015

Related U.S. Application Data

(63) Continuation of application No. 14/215,687, filed as application No. PCT/JP2011/072785 on Oct. 3, 2011, now Pat. No. 9,131,394.

(51) Int. Cl.
*H04W 72/00* (2009.01)
*H04W 24/02* (2009.01)
(Continued)

(52) U.S. Cl.
CPC ............... *H04W 24/02* (2013.01); *H04L 1/00* (2013.01); *H04L 1/0026* (2013.01); *H04L 5/005* (2013.01);
(Continued)

(58) Field of Classification Search
CPC ....... H04W 24/02; H04L 5/0023; H04L 5/005; H04L 5/0057; H04L 5/0094; H04L 5/0035
(Continued)

(56) References Cited

U.S. PATENT DOCUMENTS

2006/0068823 A1  3/2006  Kwon et al.
2010/0075689 A1  3/2010  Uemura et al.
(Continued)

FOREIGN PATENT DOCUMENTS

JP  2008-508783  3/2008
JP  2009-296665  12/2009
(Continued)

OTHER PUBLICATIONS

3GPP TS 36.211 V10.2.0; 3rd Generation Partnership Project; Technical Specification Group Radio Access Network; Evolved Universal Terrestrial Radio Access (E-UTRA); "Physical Channels and Modulation (Release 10)"; Jun. 2011.
3GPP TR 36.814 V9.0.0; 3rd Generation Partnership Project; Technical Specification Group Radio Access Network; Evolved Universal Terrestrial Radio Access (E-UTRA); "Further advancements for E-UTRA physical layer aspects (Release 9)"; Mar. 2010.
(Continued)

*Primary Examiner* — Wayne Cai
(74) *Attorney, Agent, or Firm* — Myers Wolin, LLC

(57) ABSTRACT

A radio communication system includes a base station and a mobile station communicating with the base station. The base station includes a selection unit and a first transmitting unit. The selection unit selects an item of identification information for identifying a data series from a plurality of data series corresponding to resources used to transmit a signal that the mobile station uses to measure reception quality. The first transmitting unit transmits the item of identification information. The mobile station includes a receiving unit, a measurement unit, and a second transmitting unit. The receiving unit receives the item of identification information that the first transmitting unit has transmitted. The measurement unit measures the reception quality using a signal of the data series identified by the item of identification information. The second transmitting unit transmits information indicating the reception quality that the measurement unit has measured to the base station.

19 Claims, 5 Drawing Sheets

(51) Int. Cl.
*H04L 1/00* (2006.01)
*H04L 5/00* (2006.01)
*H04W 88/08* (2009.01)

(52) U.S. Cl.
CPC .......... *H04L 5/0023* (2013.01); *H04L 5/0035* (2013.01); *H04L 5/0057* (2013.01); *H04L 5/0094* (2013.01); *H04W 88/08* (2013.01)

(58) Field of Classification Search
USPC ............ 455/450, 452.1, 452.2; 370/329, 341
See application file for complete search history.

(56) References Cited

U.S. PATENT DOCUMENTS

| | | |
|---|---|---|
| 2010/0273501 A1 | 10/2010 | Uemura et al. |
| 2010/0273502 A1 | 10/2010 | Uemura et al. |
| 2011/0190016 A1 | 8/2011 | Hamabe et al. |
| 2011/0194551 A1 | 8/2011 | Lee et al. |
| 2011/0292847 A1 | 12/2011 | Yoon et al. |
| 2012/0028628 A1 | 2/2012 | Frenger et al. |
| 2012/0108254 A1 | 5/2012 | Kwon et al. |

FOREIGN PATENT DOCUMENTS

| | | |
|---|---|---|
| WO | 2009/022752 | 2/2009 |
| WO | 2010151050 | 12/2010 |
| WO | 2011013990 A2 | 2/2011 |
| WO | 2011013990 A3 | 2/2011 |

OTHER PUBLICATIONS

Fujitsu; "Consideration on DL MIMO enhancements for practical antenna configurations"; Agenda Item: 6.3.2.2; 3GPP TSG-RAN1 #65; R1-111726; Barcelona, Spain; May 9-13, 2011.
International search report issued for corresponding international application No. PCT/JP2011/072785, mailed Jan. 10, 2012.
Notice of Preliminary Rejection issued by the Korean Intellectual Property Office for corresponding Korean Patent Application No. 10-2014-7008402, mailed on Apr. 27, 2015, with English translation.
Huawei et al., "CSI-RS port selection for distributed antennas", Agenda Item: 6.6.3, 3GPP TSG RAN WG1 Meeting #65, R1-112052, Athens, Greece, Aug. 22-26, 2011.
Qualcomm Inc, "CSI-RS Sequence for Different Antenna Ports", Agenda Item: 6.2.2.1, 3GPP TSG-RAN WG1 Meeting #63bis, R1-110500, Dublin, Ireland, Jan. 17-21, 2011.
Notice of Rejection issued for Japanese Patent Application No. 2013-537298 mailed on Jun. 23, 2015 with a partial English translation.
Pantech, "Enhance MIMO operation for low power node RRH", Agenda Item: 6.6.3, 3GPP TSG RAN1 Meeting #66, R1-112286, 3rd Generation Partnership Project (3GPP), Athens, Greece, Aug. 22-26, 2011.
Extended European search report with the supplementary European search report and the European search opinion issued for corresponding European Patent Application No. 11873637.0 mailed Jul. 13, 2015.
Non-Final Office Action issued by the United States Patent and Trademark Office for corresponding U.S. Appl. No. 14/215,687, electronically delivered on Mar. 31, 2015.

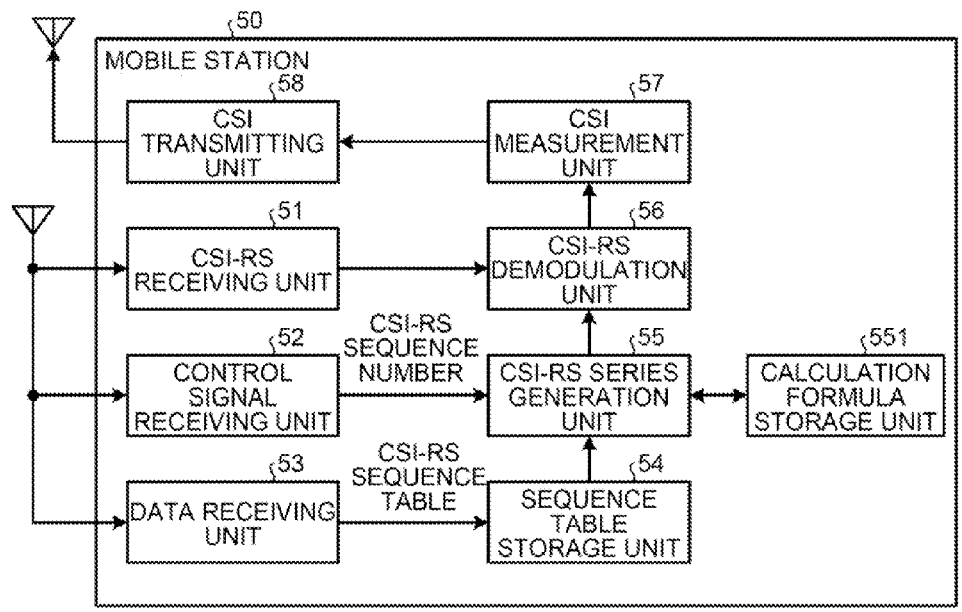

RADIO COMMUNICATION SYSTEM, BASE STATION, MOBILE STATION, AND RADIO COMMUNICATION METHOD

CROSS-REFERENCE TO RELATED APPLICATION

This application is a continuation application of U.S. application Ser. No. 14/215,687 filed on Mar. 17, 2014, now pending, which is a continuation application of International Application PCT/JP2011/072785, filed on Oct. 3, 2011, and designating the U.S., the entire contents of each are incorporated herein by reference.

FIELD

The present invention relates to a radio communication system, a base station, a mobile station, and a radio communication method.

BACKGROUND

Conventionally, there has been proposed a radio communication system in which a plurality of antennas is arranged in a cell formed by a base station in order to improve the communication quality between the base station and mobile stations. For example, Long Term Evolution (LTE) defines a method for arranging a plurality of antennas at different positions in the same cell and a method for forming an individual cell for each antenna. In a radio communication system applied with the former method, an antenna of a base station forming a cell and a plurality of antennas both exist in one cell, but overhead of a handover process is reduced. When a plurality of antennas exists in the same cell as described for the former method, a base station assigns CSI-RSs (Channel State Information-Reference Signal) of different sequence numbers to the respective antennas. Thus, the base station can receive a report of an appropriate CSI value from a mobile station.

Non Patent Document 1: 3GPP TS36.211 V10.2.0(2011-06)

Non Patent Document 2: 3GPP TR36.814 V9.0.0(2010-03)

However, the CSI-RS has limitation on the number of ports that determines physical resources available for assignment (for example, eight ports per one cell). Especially in a radio communication system having many antennas arranged in one cell, it is highly possible that the number of ports to be assigned to the antennas is not enough. In order to solve this concern, there is known a method for increasing physical resources (the number of ports per one cell). However, this method results in improvement of control channel regions requested for signal transmission. Then the increase causes decrease of data assignment regions for downlink data. As a result, capacity of data that can be transmitted to mobile stations by a base station decreases, and thus throughput of the radio communication system is deteriorated. Since increase of the number of antennas in a cell decreases the number of mobile stations per one antenna, resources available for assignment to mobile stations increase, which results in increase of throughput of the whole system. Therefore, the limitation on the number of ports for the CSI-RS has been a factor that inhibits improvement of throughput.

SUMMARY

According to an aspect of the embodiments, a radio communication system includes a base station and a mobile station communicating with the base station. The base station includes: base station includes: a selection unit that selects an item of identification information for identifying a data series from a plurality of data series corresponding to resources used to transmit a signal that the mobile station uses to measure reception quality; and a first transmitting unit that transmits the item of identification information to the mobile station. The mobile station includes: a receiving unit that receives the item of identification information that the first transmitting unit has transmitted; a measurement unit that measures the reception quality using a signal of the data series identified by the item of identification information; and a second transmitting unit that transmits information indicating the reception quality that the measurement unit has measured to the base station. The selection unit of the base station prepares a plurality of sequence numbers of the signal for respective antenna ports and sequentially changes the data series to be used by the mobile station to measure the reception quality in or after the next time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a drawing illustrating an example of data stored in a CSI-RS sequence table;

FIG. 4 is a drawing illustrating a functional structure of a mobile station;

DESCRIPTION OF EMBODIMENTS

Hereinafter, an embodiment of a radio communication system, a base station, a mobile station, and a radio communication method disclosed by the present application will be described in detail with reference to accompanying drawings. Note that the embodiment described below is not intended to limit a radio communication system, a base station, a mobile station, and a radio communication method disclosed by the present application.

Figure 1:
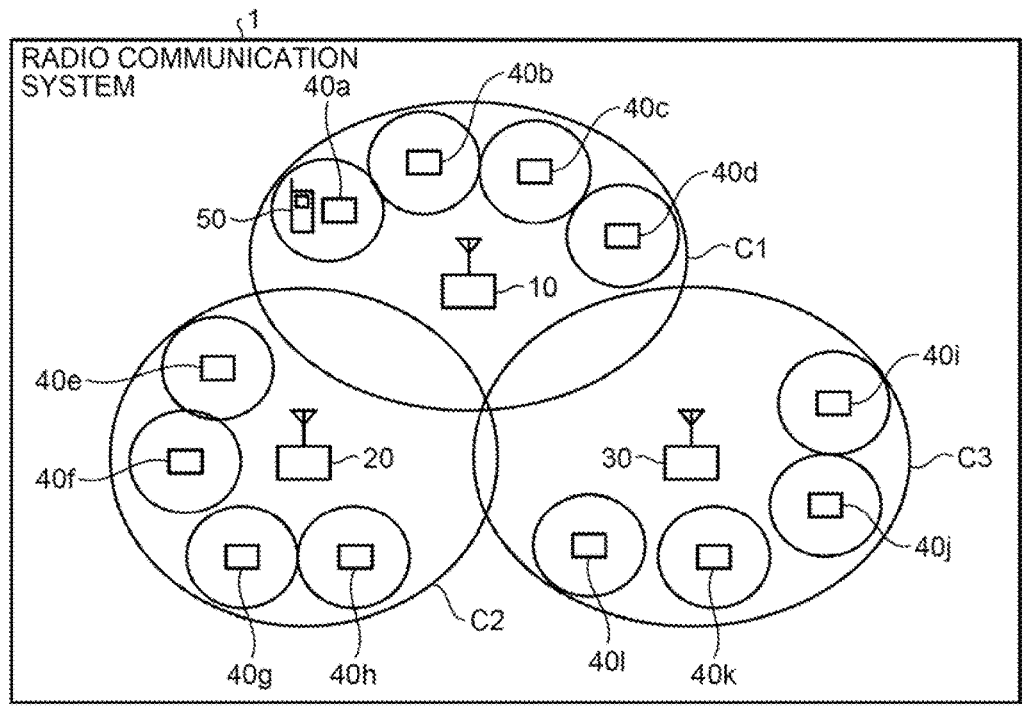
FIG. 1 is a drawing illustrating arrangement of cells and RRHs in a radio communication system.

FIG. 1 is a drawing illustrating arrangement of cells C1 to C3 and RRHs 40a to 40l in a radio communication system 1. As illustrated in FIG. 1, a plurality of base stations 10, 20, and 30 forms a plurality of cells C1, C2, and C3 in the radio communication system 1. In each of the cells C1, C2, and C3, a plurality of Remote Radio Heads (RRH) 40a to 40l is provided. Each of the RRHs 40a to 40l has an antenna (point). In each of the RRHs 40a to 40l, an antenna and a Radio Frequency (RF) unit are arranged at a position separated from a control unit including a baseband processing unit and the like. The antennas and the Radio Frequency (RF) units are respectively arranged at the edges of the cells C1, C2, and C3 of the base stations while the control units are arranged at substantially the same positions as the base stations 10, 20, and 30. The control units of the RRHs 40a to 40l are respectively connected with wire to or integrated with the base stations 10, 20, and 30, which form the cells C1, C2, and C3 in which the RRHs 40a to 40l exist. The control units are capable of cooperative scheduling with the respective base stations 10, 20, and 30. In this embodiment, a mobile station 50 exists in an RRH 40a under control of the base station 10.

FIG. 1 illustrates an example where the number of the RRHs provided in each of the cells C1, C2, and C3 is four. However, the number of RRHs per one cell can be any number and may be ten or more, for example. In particular, in this embodiment, a case where each of the RRHs forms each of nine or more (sixteen in FIG. 8 to be described below) cover areas in the same cell C1 is assumed for convenience of explanation. In addition, the position for installing an RRH is not limited to the vicinity of the edge of a cell but can be any position. However, in LTE Release 10 that has been specified, a plurality of RRHs is installed in each of the base stations 10, 20, and 30, but the radio communication system 1 has resources (time and frequency) for eight RRHs at maximum. Thus, the number of CSI-RS ports (physical resources assigned to RSs for CSI measurement) is limited to eight ports per one cell. As a result, the number of items of CSI that the mobile station 50 can measure at a time is "8".

Figure 2:
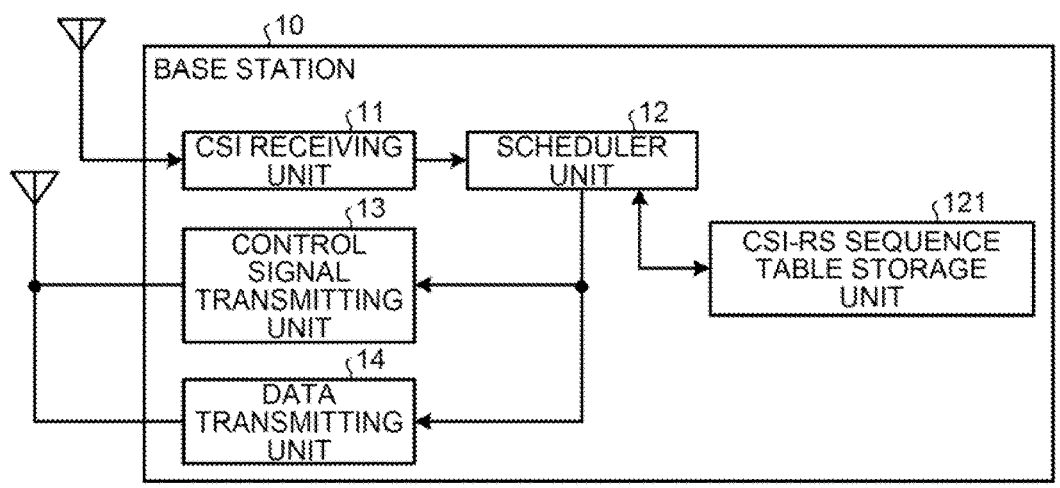
FIG. 2 is a drawing illustrating a functional structure of a base station.

FIG. 2 is a drawing illustrating a functional structure of the base station 10. As illustrated in FIG. 2, the base station 10 includes a CSI receiving unit 11, a scheduler unit 12, a sequence table storage unit 121, a control signal transmitting unit 13, and a data transmitting unit 14. Each of these components is connected such that signals and data can be input and output in one direction or both directions.

The CSI receiving unit 11 receives CSI values of the respective RRHs that the mobile station 50 has measured based on the initial value "0" of a CSI-RS sequence number (configuration). The CSI receiving unit 11 receives CSI values that have been measured based on the latest CSI-RS series from the mobile station 50. The scheduler unit 12 estimates a position of the mobile station 50 from the CSI values input from the CSI receiving unit 11 and selects a CSI-RS sequence number, which is appropriate for the position, as a next CSI-RS sequence number.

The sequence table storage unit 121 stores a CSI-RS sequence table 121a. FIG. 3 is a drawing illustrating an example of data stored in the CSI-RS sequence table 121a. According to the LTE Release 10 specification, eight ports having port numbers 15 to 22 are assigned to CSI-RSs, and thus, "15" to "22" are set as port numbers in FIG. 3. The CSI-RS sequence number (configuration) is identification information for determining a CSI-RS series used by eight ports that may be used for measurement of CSI by the mobile station 50. As illustrated in FIG. 3, the CSI-RS sequence table 121a stores parameters i's of a CSI-RS series corresponding to eight port numbers "15" to "22" for each of the CSI-RS sequence numbers. Thus, a CSI-RS series for respective ports can be determined through the parameters i's when a CSI-RS sequence number is determined.

Here, in the CSI-RS sequence table 121a, it is preferable that the combination of the port numbers and parameters i's designated by the initial value "0" of the CSI-RS sequence number correspond to RRHs dispersed uniformly in the cell C1. Therefore, in order to arrange the eight RRHs corresponding to the CSI-RS sequence number "0" in uniform density, each of the values "0" to "3" is equally set to two ports as parameters i's in FIG. 3, as an example. The base station 10 can estimate an approximate current position of the mobile station 50 based on a reported CSI value no matter where in the cell C1 the mobile station 50 exists by setting the initial values of the parameters i's of the CSI-RS series.

The control signal transmitting unit 13 transmits "0" as an initial value of the CSI-RS sequence number to the mobile station 50. The control signal transmitting unit 13 transmits the CSI-RS sequence number input from the scheduler unit 12 through the DPCCH to the mobile station 50. The data transmitting unit 14 transmits the CSI-RS sequence table 121a having a plurality of CSI-RS parameters i's set for the respective ports to the mobile station 50.

The functional structure of the base station 10 has been described above. The functional structure of other base stations 20 and 30 is similar to the base station 10, and thus the detailed description is not provided.

FIG. 4 is a drawing illustrating a functional structure of the mobile station 50. As illustrated in FIG. 4, the mobile station 50 includes a CSI-RS receiving unit 51, a control signal receiving unit 52, a data receiving unit 53, a sequence table storage unit 54, a CSI-RS series generation unit 55, a calculation formula storage unit 551, a CSI-RS demodulation unit 56, a CSI measurement unit 57, and a CSI transmitting unit 58. Each of these components is connected such that signals and data can be input and output in one direction or both directions.

The CSI-RS receiving unit 51 receives CSI-RSs transmitted from the respective RRHs including RRHs 40a to 40d. The control signal receiving unit 52 receives the CSI-RS sequence number transmitted from the base station 10 through the DPCCH. The data receiving unit 53 receives the CSI-RS sequence table 121a having a plurality of CSI-RS parameters i's set for the respective ports from the base station 10. The sequence table storage unit 54 stores the CSI-RS sequence table 121a (refer to FIG. 3) input from the data receiving unit 53 such that the CSI-RS sequence table 121a can be updated. The CSI-RS series generation unit 55 determines eight different CSI-RS series for the respective ports referring to the CSI-RS sequence table 121a based on the CSI-RS sequence number input from the control signal receiving unit 52. The calculation formula storage unit 551 stores a formula (a calculation formula (1) to be described below) used when the CSI-RS series generation unit 55 generates and determines a CSI-RS series. The CSI-RS demodulation unit 56 individually demodulates CSI-RSs transmitted from the respective RRHs using a CSI-RS series input from the CSI-RS series generation unit 55. The CSI measurement unit 57 individually calculates CSI of the respective ports using the CSI-RSs input from the CSI-RS demodulation unit 56 as reference signals. The CSI transmitting unit 58 transmits at least one of the CSI values of the respective ports input from the CSI measurement unit 57 to the base station 10.

The mobile station 50 measures the CSI based on CSI-Reference Signals (RS) transmitted at a given cycle from the base station 10 through a RRH. The CSI includes a Channel Quality Indicator (CQI), a Rank Indicator (RI), and a Precoding Matrix Index (PMI). For example, under Coordinated Multi Point transmission/reception (CoMP) of LTE, a plurality of antenna ports is defined, and the CSI-RSs are transmitted from the respective antenna ports of the base station 10. Alternatively, the radio communication system 1 can assign antenna ports to the respective RRHs 40a to 40d (refer to FIG. 1). In this case, a mobile station measures quality of signals transmitted from the respective antenna ports, and then transmits the measurement result as CSI to the base station 10. Thus, the base station 10 can estimate a RRH near which each mobile station is located among the RRH 40a to 40d.

Figure 5:
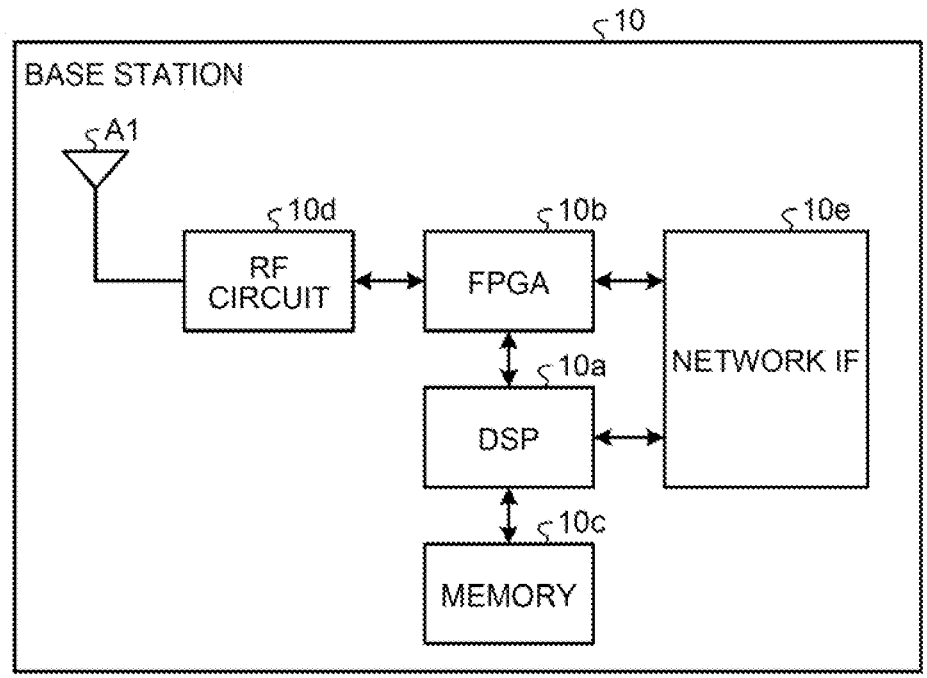
FIG. 5 is a drawing illustrating a hardware configuration of the base station.

FIG. 5 is a drawing illustrating the hardware configuration of the base station 10. As illustrated in FIG. 5, the base station 10 includes a Digital Signal Processor (DSP) 10a, a Field Programmable Gate Array (FPGA) 10b, a memory 10c, a Radio Frequency (RF) circuit 10d and a network Inter Face (IF) 10e as hardware components. The DSP 10a and the FPGA 10b are connected such that various signals and data can be input and output through the network IF 10e such as a switch. The RF circuit 10d includes an antenna A1. The memory 10c may be a RAM such as a Synchronous Dynamic Random Access Memory (SDRAM), a ROM (Read Only Memory), or a flash memory, for example. The scheduler unit 12 is realized by an integrated circuit such as the DSP 10a and the FPGA 10b. The CSI receiving unit 11, the control signal transmitting unit 13, and the data transmitting unit 14 are realized by the RF circuit 10d. The sequence table storage unit 121 is realized by the memory 10c. The hardware configuration of the base station 10 has been described above. Other base stations 20 and 30 have hardware configurations similar to that of the base station 10, and thus the detailed description thereof will not be provided.

Figure 6:
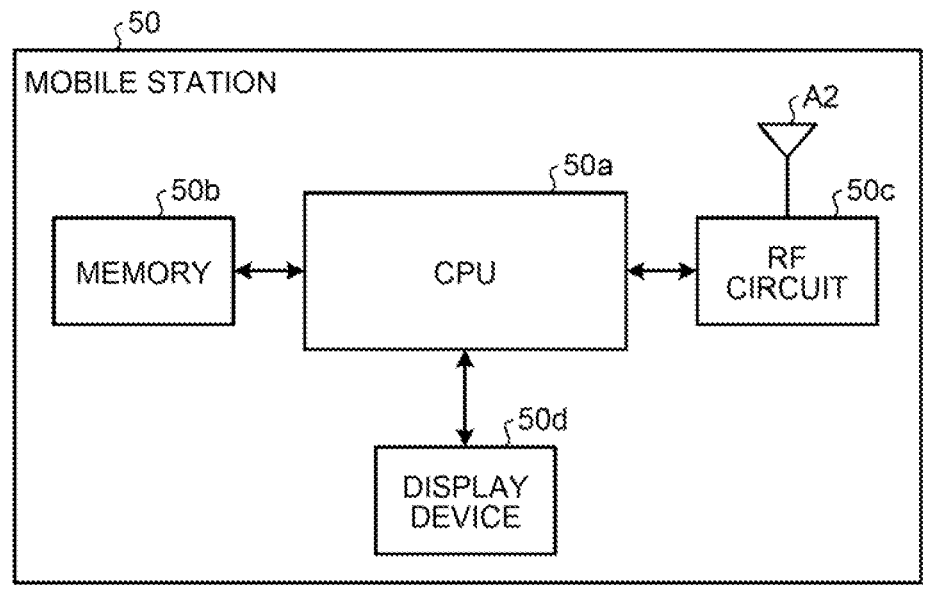
FIG. 6 is a drawing illustrating a hardware configuration of the mobile station.

The above described mobile station 50 is physically realized by a mobile station, for example. FIG. 6 is a drawing illustrating the hardware configuration of the mobile station 50. As illustrated in FIG. 6, the mobile station 50 includes a Central Processing Unit (CPU) 50a, a memory 50b, an RF circuit 50c provided with an antenna A2, and a display device 50d such as a Liquid Crystal Display (LCD) as hardware components. The memory 50b may be a RAM such as an SDRAM, a ROM, or a flash memory, for example. The CSI-RS receiving unit 51, the control signal receiving unit 52, the data receiving unit 53, the CSI-RS demodulation unit 56, and the CSI transmitting unit 58 are realized by the RF circuit 50c. The CSI-RS series generation unit 55 and the CSI measurement unit 57 are realized by an integrated circuit such as the CPU 50a. The sequence table storage unit 54 and the calculation formula storage unit 551 are realized by the memory 50b.

Next, operation of the radio communication system 1 according to this embodiment will be described. As an assumption of the description, CSI is set at the same time with the setting (configure) of the Physical Downlink Shared CHannel (PDSCH), which is a downlink data channel. Then, the CSI is reported as a downlink reception quality to a base station over an uplink channel. CSI-RS is a known signal (pilot signal) in downlink for determining the CSI. A mobile station measures reception quality of the CSI-RS, calculates the CSI, and reports the result to the base station. As described above, for CSI-RS, eight ports are defined per a cell, and thus a mobile station can measure up to eight CSI-RSs at a time. These eight ports are identified using different frequency resources or time resources in Orthogonal Frequency Division Multiplexing (OFDM). In order to make CSI-RSs distinguishable between different cells, a pseudorandom number sequence is applied to the CSI-RS. A specific CSI-RS sequence is described in 3GPP specification (refer to section 6.10.5 of TS36.211), and thus the detailed description thereof will not be provided. A CSI-RS sequence is defined by the number of OFDM symbol 1, a slot number nS, and a subcarrier number m. A CSI-RS sequence has subframe periodicity and a series of Gold symbol c(n) is provided in the subcarrier direction.

Figure 7:
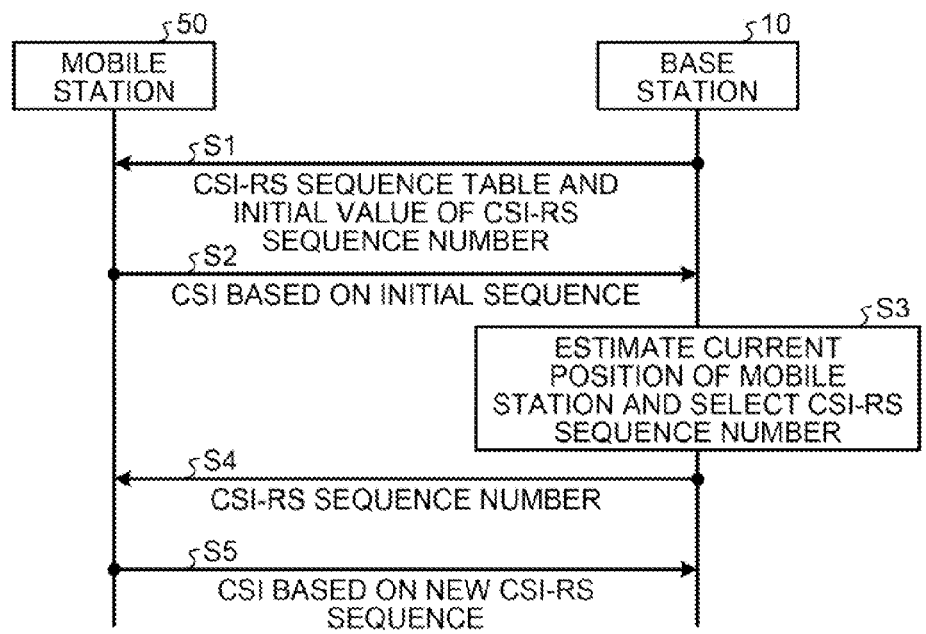
FIG. 7 is a sequence diagram for describing operation of the radio communication system.

In the operation description below, a case where the mobile station 50 exists in the cell C1 formed by the base station 10 and communicates with the base station 10 through a radio channel is assumed. FIG. 7 is a sequence diagram for describing operation of the radio communication system 1.

In S1, the base station 10 transmits the CSI-RS sequence table 121a and "0" that is an initial value of the CSI-RS sequence number to the mobile station 50. The mobile station 50 stores the received CSI-RS sequence table 121a and obtains parameters i's corresponding to the initial value "0" of the CSI-RS sequence number from the CSI-RS series generation unit 55. As the parameters i's for the CSI-RS sequence number "0", "i=0" is designated to be used for the ports 15 and 16, "i=1" is designated to be used for the ports 17 and 18, "i=2" is designated to be used for the ports 19 and 20, and "i=3" is designated to be used for the ports 21, 22 corresponding to the port numbers (refer to FIG. 3). The conventional CSI-RS sequence provides different series for different cells but provides the same series for the same cell according to the specification. The CSI-RS series generation unit 55 can generate different CSI-RS series for the respective ports by substituting the i's in the following calculation formula (1).

$$c_{init}' = 2^{13} \cdot (7 \cdot (n_s+1)+l+1) \cdot (2 \cdot N_{ID}^{cell}+1) + 2^4 \cdot N_{ID}^{cell} + 2^3 \cdot N_{CP}+i \quad (1)$$

Here, $c_{init}'$ is an initial value of the above-described Gold symbol. $n_s$, l, and $N_{ID}$ are respectively a slot number, an OFDM symbol number, and a cell ID defined in section 6.10.5 of TS36.211. $N_{CP}$ is an identification number of a Cyclic Prefix (CP), and "$N_{CP}=1$" is satisfied for a normal CP and "$N_{CP}=0$" is satisfied for an extended CP. That is, the value of $c_{init}'$ is set to be different depending on the CP length.

As described above, in the c(n) of this embodiment, a new parameter i is introduced to calculate an initial value of the above calculation formula (1). Therefore, when the base station 10 and the mobile station 50 appropriately change the parameter i of $c_{init}'$, the value of $c_{init}$ is extended and another initial value is designated. Accordingly, another CSI-RS sequence can be generated for whole series.

Note that, in FIG. 3, the same parameter i is set to different ports for the same CSI-RS sequence number (for example, the parameters i's set to ports 16 and 17 for the CSI-RS sequence number "2" are both "1"). However, since a combination of a port and a parameter i is associated with each of RRHs in a cell, the CSI-RS sequence is determined based on a combination of a port number and a parameter i. Therefore, in the same cell, it is possible to generate different CSI-RS sequences for all ports. In other words, it is possible to generate CSI-RS sequences that are unique to the respective ports.

In S2, the mobile station 50 reports, to the base station 10, CSI values using CSI-RSs of a series obtained by substituting the initial value as the parameter i. The CSI values reported at this time are not necessarily CSI values obtained using CSI-RSs transmitted from all eight RRHs, but may be narrowed down as far as the base station 10 can effectively estimate the position. For example, the mobile station 50 may report at least one (three, for example) CSI values in the descending order among the measured eight CSI values. In this way, resources used to transmit CSI values can be reduced.

In S3, the base station 10 estimates the current position of the mobile station 50 based on the CSI values that the scheduler unit 12 has reported in S2. For example, the base station 10 estimates the position of an RRH that has reported the maximum CSI value as the position of the mobile station 50. The base station 10 selects a CSI-RS sequence number for specifying a cover area such that an RRH from which the reception quality at the mobile station 50 is the highest among the eight RRHs exists near or at the center of the cover area of the eight RRHs. In other words, the base station 10 selects a CSI-RS sequence number such that the estimated position of the mobile station 50 is near or at the center of the cover area of the eight RRHs.

Figure 8:
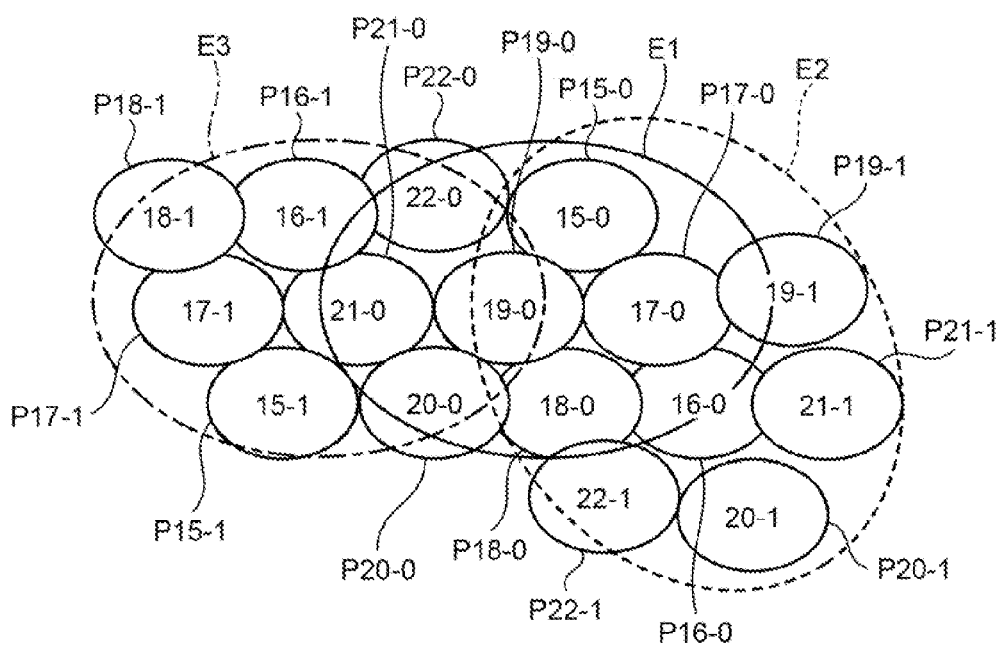
FIG. 8 is a drawing illustrating positional relation between cover areas of respective RRHs and a cover area of the eight RRHs specified by respective CSI-RS sequence numbers.

FIG. 8 is a drawing illustrating positional relation of the cover areas of the respective RRHs and the cover area of the eight RRHs that has been specified based on the CSI-RS sequence numbers. In FIG. 8, when it has been estimated in S3 that the mobile station 50 is positioned in an area P21-0, for example, a cover area including the area P21-0 at the area center is a cover area E3, which is illustrated by a dashed line. Thus, the CSI-RS sequence number "3" (refer to FIG. 3) for specifying the cover area E3 is selected. Similarly, when it has been estimated in S3 that the mobile station 50 is positioned in an area P16-0, for example, a cover area including the area P16-0 at the area center is a cover area E2, which is illustrated by a dashed line. Thus, the sequence number "2" (refer to FIG. 3) that identifies the cover area "E2" is selected.

In the following S4 and S5, the base station 10 updates the CSI-RS sequence number (configuration) from the initial value in order to estimate the position of the mobile station 50 more accurately, select an antenna to be used for transmission through the PDSCH, or obtain CSI for precoding. Processing of respective S4 and S5 is similar to that of S1 and S2 as described above, and thus the detailed description is not provided. However, in S4, the CSI-RS sequence number that the base station 10 has selected in S3 is reported to the mobile station 50. In S5, the CSI value measured using a CSI-RS series of the parameter i based on the new CSI-RS sequence number after update is reported to the base station 10.

Here, a case where it is estimated that the mobile station 50 exists near or at the RRH having a cover area of the area P16-0 in FIG. 8 is assumed. The mobile station 50 preferably reports CSI values corresponding to RRHs residing in the cover area E2 illustrated by a broken line from a view point of reporting accurate CSI values obtained by removing interference by other RRHs and base stations and influence of shields. Thus, the base station 10 reports the CSI-RS sequence number "2" corresponding to the cover area E2 to the mobile station 50. Thus, the base station 10 designates parameters i's residing in the CSI-RS sequence number "2" as parameters that the mobile station 50 uses for CSI measurement. As a result, the base station 10 can receive a more accurate report of CSI values from the mobile station 50.

Then, the mobile station 50 moves and, it is assumed that the base station 10 receives a report that the reception quality (CSI) from an RRH forming an area P19-0 is the best from the mobile station 50, for example. In this case, it is desirable that the base station 10 receive reports of reception quality from eight RRHs residing in the cover area E1 centering on the area P19-0 in order to receive a report of more accurate (higher) CSI value. This report is available by the base station 10 notifying the CSI-RS sequence number "1" to the mobile station 50. Similarly, when the base station 10 receives a report that the reception quality from an RRH forming the area P21-0 is the best, the base station 10 notifies the CSI-RS sequence number "3" to the mobile station 50. Thus, the base station 10 can set a CSI-RS sequence (configuration) that is appropriate for the position of the mobile station 50 regardless of the position. Therefore, the base station 10 can maximally utilize the number of ports that is eight and thus can obtain an accurate CSI value corresponding to the position of the mobile station 50 without increasing the number of ports.

Note that it is desirable to use Dedicated Physical Control CHannel (DPCCH) or Enhanced-Dedicated Physical Control CHannel (E-DPCCH) that is enhanced for CoMP because the notification of the CSI-RS sequence number (setting of configuration) in S1 and S4 involves change of information of layer 1 called CSI. This reduces the occurrence of delay. However, the notification may be performed using a method for inserting the notice in the Media Access Control (MAC) element, or a method for notifying by an Radio Resource Control (RRC) message of an upper layer. When these methods are employed, transmission is performed on the PDSCH, and thus frequency utilization efficiency is enhanced.

Figure 9:
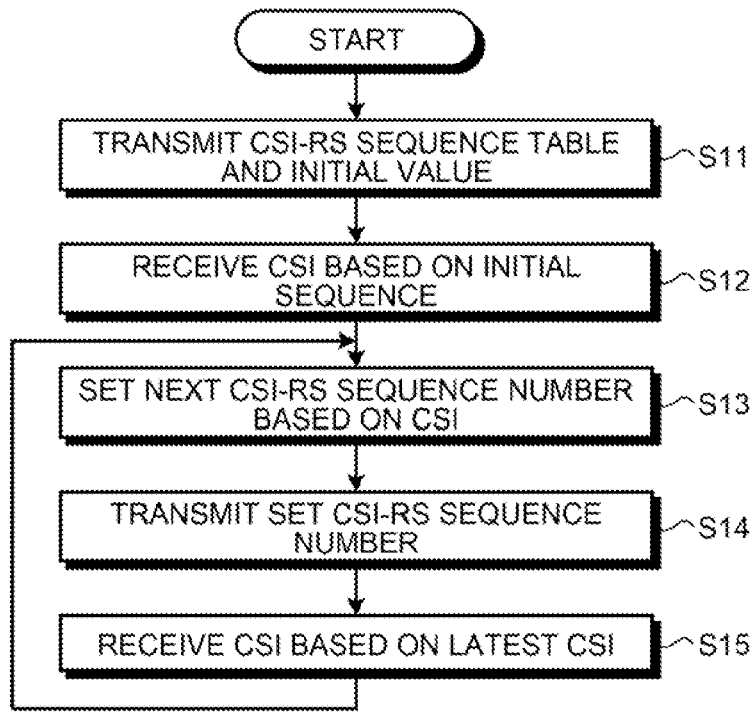
FIG. 9 is a flowchart for describing operation of the base station.
Figure 10:
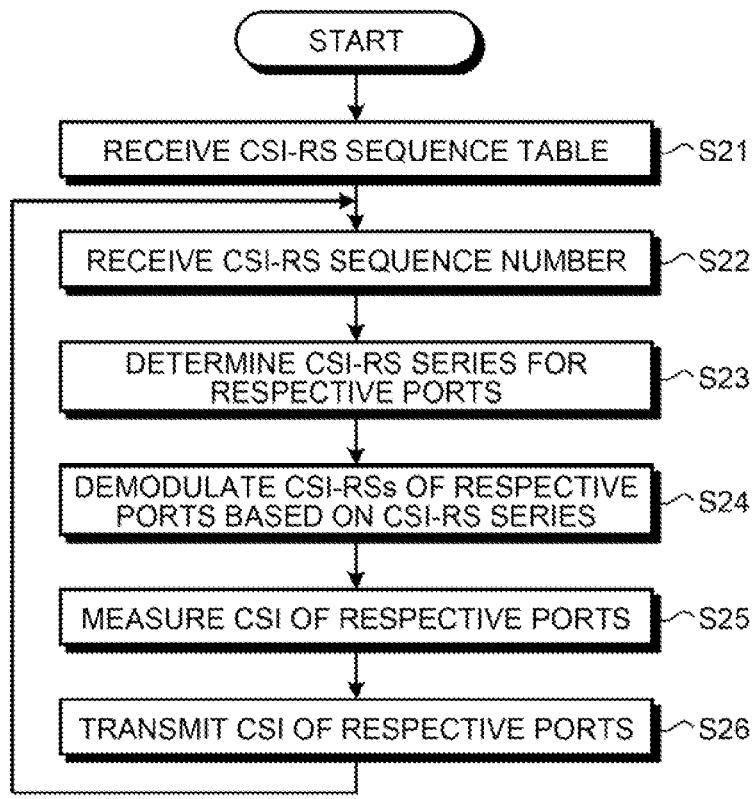
FIG. 10 is a flowchart for describing operation of the mobile station.

Next, operation of the base station 10 and the mobile station 50 will be respectively described referring to FIGS. 9 and 10. FIG. 9 is a flowchart for describing operation of the base station 10. In S11, the data transmitting unit 14 of the base station 10 transmits the CSI-RS sequence table 121a having a plurality of CSI-RS parameters i's set for the respective ports to the mobile station 50. In addition, the control signal transmitting unit 13 transmits "0" as an initial value of the CSI-RS sequence number to the mobile station 50. In S12, the CSI receiving unit 11 receives the CSI values for the respective RRHs that the mobile station 50 has measured based on the initial value of the CSI-RS sequence number. In S13, the scheduler unit 12 estimates the position of the mobile station 50 from the CSI values having been received in S12 and selects a CSI-RS sequence number that is appropriate for the position as the next CSI-RS sequence number (after change). Thus, the next values of the parameters i's of the CSI-RS series are set for the respective ports. In S14, the control signal transmitting unit 13 transmits the CSI-RS sequence number having been selected in S13 to the mobile station 50 through the DPCCH. In S15, the CSI receiving unit 11 receives CSI values measured based on the latest CSI-RS series to the mobile station 50. The base station 10 returns back to S13 after the processing of S15 and repeatedly performs the processing of S13 and the following steps.

FIG. 10 is a flowchart for describing operation of the mobile station 50. In S21, the data receiving unit 53 of the mobile station 50 receives the CSI-RS sequence table 121a having a plurality of CSI-RS parameters i's set for the respective ports from the base station 10. In S22, the control signal receiving unit 52 receives the CSI-RS sequence number transmitted from the base station 10 through the DPCCH. In S23, the CSI-RS series generation unit 55 determines eight different CSI-RS series for the respective ports by referring to the CSI-RS sequence table 121a based on the CSI-RS sequence number having been received in S22. The CSI-RS series are generated and determined by the CSI-RS series generation unit 55 substituting the values of the parameters i's specified based on the CSI-RS sequence number in the above calculation formula (1) stored in the calculation formula storage unit 551. In S24, the CSI-RS demodulation unit 56 individually demodulates CSI-RSs transmitted from the respective RRHs using the CSI-RS series having been determined in S23. In S25, the CSI measurement unit 57 individually measures the CSI of the respective ports using the CSI-RSs having been transmitted from the respective RRHs and demodulated in S24 as reference signals. In S26, the CSI transmitting unit 58 transmits at least one of the CSI values of the respective ports having been calculated in S25 to the base station 10. The mobile station 50 returns back to S22 after the processing of S26, waits for reception of the CSI-RS sequence number, and repeatedly performs the processing of S22 and the following steps.

When the mobile station 50 does not exist in a cover area (cover area E2, for example) of the eight RRHs, which has been designated by the base station 10, measurement of the CSI of the mobile station 50 may be unavailable. When the mobile station 50 exists in a cover area (cover area E2, for example) of the eight RRHs, which has been designated by the base station 10, but the position thereof is at the edge of the area, measurement of the CSI of the mobile station 50 is available but the measurement may not be accurate. Therefore, the base station 10 continuously performs the series of processing described in S13 to S15, and the mobile station 50 continuously performs the series of processing described in S22 to S26 as described above. With this operation, the base station 10 performs control of changing the cover area by updating the CSI-RS sequence number until an RRH from which the reception quality at the mobile station 50 is the highest is finally near or at the center of a cover area of the eight RRHs. In addition, when the mobile station 50 moves, the base station 10 performs control of causing the cover area to follow the movement of the mobile station 50 by updating the CSI-RS sequence number such that the mobile station 50 is always near or at the center of the cover area of the eight RRHs. As a result, the cover area of the eight RRHs flexibly changes corresponding to the position of the mobile station 50.

As described above, in the radio communication system 1, the base station 10 communicates with the mobile station 50. The base station 10 includes the scheduler unit 12 and the control signal transmitting unit 13. The scheduler unit 12 selects identification information (CSI-RS sequence number) for identifying a data series corresponding to the position of the mobile station 50 among a plurality of data series (sequence) corresponding to a physical resource (port) used to transmit a signal (CSI-RS) that the mobile station 50 uses to measure the reception quality. The control signal transmitting unit 13 transmits the identification information to the mobile station 50. The mobile station 50 includes the control signal receiving unit 52, the CSI measurement unit 57, and the CSI transmitting unit 58. The control signal receiving unit 52 receives the identification information that the control signal transmitting unit 13 has transmitted. The CSI measurement unit 57 measures the reception quality (CSI) using the signal of the data series identified using the identification information. The CSI transmitting unit 58 transmits information indicating the reception quality that the CSI measurement unit 57 has measured to the base station 10.

In particular, the identification information is information indicating correspondence between a resource (a port as a physical resource) used to transmit the signal to the mobile station 50 and a parameter i for specifying the data series. With this, the mobile station 50 can easily recognizes parameters i's of the CSI-RS series that are different between the ports only by receiving the CSI-RS sequence number from the base station 10.

In addition, the data transmitting unit 14 may transmit information (the CSI-RS sequence table 121a) in which the correspondence is set for each items of the identification information to the mobile station 50 before transmission of the identification information. Thus, not only the base station 10 but also the mobile station 50 can refer the CSI-RS sequence table 121a. Therefore, the mobile station 50 can specify a CSI-RS series for the respective ports that may be used to demodulate CSI-RSs for the respective port only by receiving the CSI-RS sequence number from the base station 10. As a result, the mobile station 50 can measure a plurality of items of CSI using different (eight in this embodiment) CSI-RSs regardless of the current position in the cell C1.

That is, the base station 10 sets a plurality of CSI-RS series and notifies which of these CSI-RS series may be actually used to the mobile station 50 by a CSI-RS sequence number. The mobile station 50 specifies which CSI-RS series may be used for each of the ports based on the notified CSI-RS sequence number. The mobile station 50 measures the CSI-RSs from the eight RRHs positioned in the periphery using the specified CSI-RS series and reports the measurement result as CSI to the base station 10. In other words, the base station 10 prepares a plurality of sequence numbers of the CSI-RSs for the respective ports and sequentially changes the CSI-RS series to be used by the mobile station 50 to measure the CSI in or after the next time based on the CSI reported from the mobile station 50. Thus, CSI-RSs can be reused (recycled) by nine or more RRHs, and thus the base station 10 can maintain the number of items of CSI measured by the mobile station 50 at a time to a certain value (eight). Therefore, the mobile station 50 can report items of CSI of RRHs needed by the base station 10 for detection of reception quality to the base station 10 without measuring many (nine or more) items of CSI at once.

As described above, according to the radio communication system 1, not only the base station 10 but also the mobile station 50 can identify all RRHs installed in the cell C1 without increasing the number of ports by appropriately changing the CSI-RS sequence number. Thus, in the radio communication system 1, many, that is, nine or more RRHs can be installed in each cell. Therefore, the number of mobile stations per one RRH decreases, and communication capacity of the radio communication system 1 increases. As a result, throughput of the whole system can be improved without increasing the number of physical resources for CSI-RSs. For example, when the base station 10 selects a cover area of the eight RRHs such that the mobile station 50 exists near or at the center of the area by selecting a CSI-RS sequence number, the base station 10 can select the above cover area without excluding an RRH associated with the maximum CSI value from the area. Thus, the mobile station 50 can measure CSI without missing the maximum item of CSI among the eight items of CSI. Therefore, the mobile station 50 can measure CSI accurately.

As another technique to increase the number of RRHs, there is a known technique of using a plurality of the same CSI-RS series in the same cell. However, according to this technique, CSI-RSs from RRHs that are not CSI-measurement target of a mobile station are unfortunately mixed in CSI-RSs from RRHs that are actual measurement targets. Therefore, it becomes difficult for the mobile station to obtain accurate measurement result of CSI, and thus the measurement accuracy may be deteriorated. On this point, in the radio communication system 1 according to this embodiment, the mobile station 50 can measure CSI using CSI-RSs of different series for the respective ports. Therefore, mixture of the CSI-RSs is not caused between RRHs that are geographically separated or even between adjacent RRHs, resulting in suppression of deterioration of measurement accuracy.

In the embodiment, the base station 10 transmits the CSI-RS sequence table 121a to the mobile station 50 prior to designation of a CSI-RS sequence number to the mobile station 50. However, the transmission is not necessary and correspondence between CSI-RS sequence numbers and CSI-RS series parameters i's of the respective ports may be previously determined by specification. According to this technique, the mobile station 50 can eliminate setting processing of the above correspondence based on the CSI-RS sequence table 121a. In contrast, the base station 10 may form eight different values of CSI-RS series parameters i's for the respective port numbers that are appropriate to the position of the mobile station 50 and may notify the values to the mobile station 50 every time they are formed. Thus, the base station 10 can eliminate processing of transmitting the CSI-RS sequence table 121a in advance. In addition, only pinpoint parameters i's actually needed by the mobile station 50 are transmitted and received. Thus, in comparison to a case where a table in which all estimated parameters i's are recorded is transmitted and received, load and time due to data transmission/reception can be reduced.

Although an example of data stored in the CSI-RS sequence table 121a is illustrated in FIG. 3, the data can be appropriately updated corresponding to factors causing change such as installation positions of the respective RRHs, arrangement relation between the RRHs and a base station, or an operation status and a radio wave state of the respective RRHs. The scheduler unit 12 changes setting value of the parameters i's corresponding to the above factors causing change, whereby the base station 10 can indirectly adjust the combination of eight RRHs and thus can adjust a cover area (position, size, shape, and the like) thereof flexibly. Thus, the base station 10 transmits CSI-RSs to the respective RRHs by recycling the eight ports as needed. Therefore, the base station 10 can cover all range of the cell C1 without increasing the number of ports to more than eight while the number of ports usually needed to be prepared is the number of RRHs (antennas) arranged in the cell (twenty, for example). As a result, the radio communication system 1 allows more RRHs to be installed in the cell C1 regardless of the limitation of the number of existing ports.

The above embodiment has been described assuming that the cover areas of the respective RRHs exist in the same cell C1, but the cover areas of the respective RRHs may exist over different cells (cells C1 and C3, for example). The cover areas E1 to E3 of the eight RRHs do not necessarily exist in a single cell C1 similarly to the cover areas of the respective RRHs, and a part or whole of the cover area can exist in another cell (cell C2 or C3, for example).

The above embodiment is described assuming a mobile station, a smart phone, or a Personal Digital Assistant (PDA) as a mobile station, but the present invention is applicable not only to mobile stations but to various communication apparatuses communicating with a base station.

It is not necessary for the respective components of the base station 10 and the mobile station 50 to be physically configured as illustrated in the drawings. That is, specific aspect of distribution/integration of the each device is not limited to the one as illustrated but a part or whole of the device can be functionally or physically distributed/integrated in arbitrary units corresponding to various kinds of load, usage status and the like. For example, the CSI-RS demodulation unit 56 and the CSI measurement unit 57 of the mobile station 50 may be integrated as one component, and the control signal transmitting unit 13 and the data transmitting unit 14 of the base station 10 may be integrated as one component. In contrast, the scheduler unit 12 may be distributed into a part that estimates the position of a mobile station based on a CSI value and a part that selects an appropriate CSI-RS sequence number that is optimum to the estimated position. In addition, the memories 10c and 50b may configured as external devices of the base station 10 and the mobile station 50 and may be connected through a network or a cable.

An aspect of the radio communication system disclosed in the present application has an effect of improving throughput.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio communication system comprising a base station and a mobile station communicating with the base station, wherein
the base station includes:
a processor configured to:
select identification information for identifying a data series corresponding to a position of the mobile station from a plurality of data series corresponding to resources used to transmit a signal that the mobile station uses to measure reception quality, the identification information indicating a correspondence between one or more antenna ports and a parameter for specifying the data series, wherein the parameter for specifying the data series changes the data series based on the corresponding position of the mobile station; and
a transmitter configured to transmit the identification information to the mobile station, and
the mobile station includes:
a receiver configured to receive the identification information transmitted by the base station;
a processor configured to measure the reception quality at the one or more antenna ports using the signal of the data series identified by the identification information; and
a transmitter configured to transmit, to the base station, information indicating the reception quality at the one or more antenna ports, wherein
the base station processor is further configured to prepare a plurality of sequence numbers of the signal for respective antenna ports and provide the data series to be used by the mobile station to measure the reception quality.

2. The radio communication system according to claim 1, wherein the identification information indicates correspondence between a resource used to transmit the signal to the mobile station and a parameter for specifying the data series.

3. The radio communication system according to claim 2, wherein the base station transmitter is configured to transmit information in which the correspondence is set for each item of identification information to the mobile station prior to transmission of the identification information.

4. A base station comprising:
a processor configured to:
select identification information for identifying a data series corresponding to a position of a mobile station from a plurality of data series corresponding to resources used to transmit a signal that the mobile station uses to measure a reception quality, the identification information indicating a correspondence between one or more antenna ports and a parameter for specifying the data series, wherein the parameter for specifying the data series changes the data series based on the corresponding position of the mobile station;
a transmitter configured to transmit the identification information to the mobile station; and
a receiver configured to receive, from the mobile station, information indicating the reception quality at the one or more antenna ports that is measured using the signal of the data series identified by the identification information, wherein
the processor is further configured to prepare a plurality of sequence numbers of the signal for respective antenna ports and provide the data series to be used by the mobile station to measure the reception quality.

5. The base station according to claim 4, wherein the identification information indicates correspondence between a resource used to transmit the signal to the mobile station and a parameter for specifying the data series.

6. The base station according to claim 5, wherein the transmitter is further configured to transmit information in which the correspondence is set for each item of identification information to the mobile station prior to transmission of the identification information.

7. A mobile station comprising:
a receiver configured to receive, from a base station, identification information for identifying a data series from a plurality of data series corresponding to resources used to transmit a signal that the mobile station uses to measure reception quality, the identification information indicating a correspondence between one or more antenna ports and a parameter for specifying the data series, wherein the parameter for specifying the data series changes the data series based on a corresponding position of the mobile station;
a processor configured to measure the reception quality at the one or more antenna ports using the signal of the data series identified by the identification information; and
a transmitter configured to transmit, to the base station, information indicating the reception quality, measured by the mobile station, at the one or more antenna ports, wherein
the data series is provided to measure the reception quality.

8. The mobile station according to claim 7, wherein the identification information indicates correspondence between a resource used to transmit the signal to the mobile station and a parameter for specifying the data series.

9. The mobile station according to claim 8, wherein the receiver is further configured to receive information in which the correspondence is set for each item of identification information prior to transmission of the identification information.

10. A mobile station comprising:
an RF circuit configured to receive, from a base station, identification information for identifying a data series from a plurality of data series corresponding to resources used to transmit a signal that the mobile station uses to measure reception quality, the identification information indicating a correspondence between one or more antenna ports and a parameter for specifying the data series, wherein the parameter for specifying the data series changes the data series based on a corresponding position of the mobile station;
an integrated circuit configured to measure the reception quality at the one or more antenna ports using the signal of the data series identified by the identification information; and
the RF circuit further configured to transmit information indicating the measured reception quality at the one or more antenna ports to the base station, wherein
the data series is provided to measure the reception quality.

11. The mobile station according to claim 10, wherein the identification information indicates correspondence between a resource used to transmit the signal to the mobile station and a parameter for specifying the data series.

12. The mobile station according to claim 11, wherein the RF circuit is further configured to receive information in which the correspondence is set for each item of identification information prior to transmission of the identification information.

13. A base station comprising:
a processing circuit configured to select identification information for identifying a data series corresponding to a position of a mobile station from a plurality of data series corresponding to resources used to transmit a signal that a mobile station uses to measure reception quality, the identification information indicating a correspondence between one or more antenna ports and a parameter for specifying the data series, wherein the parameter for specifying the data series changes the data series based on the corresponding position of the mobile station;
an RF circuit configured to transmit the identification information to the mobile station, and further configured to receive from the mobile station information indicating reception quality at the one or more antenna ports that is measured using the signal of the data series identified by the identification information; and
the processing circuit is further configured to prepare a plurality of sequence numbers of the signal for respective antenna ports and provides the data series to be used by the mobile station to measure the reception quality.

14. The base station according to claim 13, wherein the identification information indicates correspondence between a resource used to transmit the signal to the mobile station and a parameter for specifying the data series.

15. The base station according to claim 14, wherein the RF circuit is further configured to transmit information in which the correspondence is set for each item of identification information to the mobile station prior to transmission of the identification information.

16. A method executed by a mobile station including a processing circuit and memory, the method comprising:
receiving identification information for identifying a data series from a plurality of data series corresponding to resources used to transmit a signal that the mobile station uses to measure reception quality, the identification information indicating a correspondence between one or more antenna ports and a parameter for specifying the data series, wherein the parameter for specifying the data series changes the data series based on a corresponding position of the mobile station;

measuring the reception quality at the one or more antenna ports using the signal of the data series identified by the identification information; and transmitting information to a base station indicating the measured reception quality at the one or more antenna ports, wherein the data series is provided to measure the reception quality.

17. The method according to claim 16, further comprising:

receiving information in which correspondence is set for each item of identification information prior to transmission of the identification information, wherein the identification information indicates the correspondence between a resource used to transmit the signal to the mobile station and a parameter for specifying the data series.

18. A mobile station comprising:

an RF circuit configured to receive, from a base station, identification information for identifying a data series from a plurality of data series corresponding to resources used to transmit a signal that the mobile station uses to measure reception quality, the identification information indicating a correspondence between one or more antenna ports and a parameter for specifying the data series, wherein the parameter for specifying the data series changes the data series based on a corresponding position of the mobile station;

an integrated circuit configured to measure the reception quality at the one or more antenna ports using the signal of the data series identified by the identification information; and the RF circuit further configured to transmit information indicating measured reception quality at the one or more antenna ports to the base station, wherein the data series is properly changed by the base station to measure the reception quality using on the parameter for specifying the data series.

19. A base station comprising:

a processing circuit configured to select identification information for identifying a data series corresponding to a position of a mobile station from a plurality of data series corresponding to resources used to transmit a signal that a mobile station uses to measure reception quality, the identification information indicating a correspondence between one or more antenna ports and a parameter for specifying the data series;

an RF circuit configured to transmit the identification information to the mobile station, and further configured to receive from the mobile station information indicating reception quality at the one or more antenna ports that is measured using the signal of the data series identified by the identification information; and the processing circuit is further configured to prepare a plurality of sequence numbers of the signal for respective antenna ports and properly changes the data series to be used by the mobile station to measure the reception quality using on the parameter for specifying the data series.

* * * * *